United States Patent [19]

Wolniak et al.

[11] Patent Number: 4,566,167

[45] Date of Patent: Jan. 28, 1986

[54] METHOD FOR ASSEMBLY OF ANTI-STATIC SWITCH LOCK

[75] Inventors: Stanley C. Wolniak, Broadview; Herbert Kincaid, Libertyville; Elbert M. Spencer, Wildwood; Ronald L. Brown, Waukegan, all of Ill.

[73] Assignee: The Eastern Company, Naugatuck, Conn.

[21] Appl. No.: 538,338

[22] Filed: Oct. 3, 1983

Related U.S. Application Data

[62] Division of Ser. No. 411,259, Aug. 25, 1982, Pat. No. 4,427,852.

[51] Int. Cl.[4] ....................... B23P 11/00; B21D 39/00

[52] U.S. Cl. ........................................ 29/437; 29/511; 200/43.08

[58] Field of Search ......................... 29/434, 510, 511; 200/42 R, 44, 303, 293

[56] References Cited

U.S. PATENT DOCUMENTS

| | | | |
|---|---|---|---|
| 1,747,383 | 2/1930 | Norviel | 200/44 X |
| 1,809,368 | 6/1931 | Winning | 200/44 X |
| 1,945,562 | 2/1934 | Norviel | 200/44 |
| 2,655,570 | 10/1953 | Brown et al. | 200/44 |
| 2,695,932 | 11/1954 | Jacobi | 200/44 X |
| 2,715,661 | 8/1955 | Miller | 200/44 X |
| 2,768,725 | 10/1956 | Foulds et al. | 29/511 X |
| 3,125,493 | 3/1964 | D'Amore | 29/434 X |
| 3,218,401 | 11/1965 | Root | 200/44 |
| 4,190,940 | 3/1980 | Lawrence | 29/434 X |
| 4,378,174 | 3/1983 | Hesse | 29/511 X |

*Primary Examiner*—Howard N. Goldberg
*Assistant Examiner*—Ronald S. Wallace
*Attorney, Agent, or Firm*—Wood, Dalton, Phillips, Mason & Rowe

[57] ABSTRACT

An anti-static switch lock wherein a terminal assembly having the desired configuration of rotor and contacts is secured to one end of a hub. The other end of the hub has an inboard lipped boss forming, in cooperation with the hub end, a circumscribed radial groove. A keylock assembly includes a barrel, one end of which has a chamber to receive the boss of the hub, and a key operated, rotatable plug. The hub, having the terminal assembly attached to one end, is positioned such that the groove is disposed within the chamber of the barrel. A number of stakes are formed in the barrel, the stakes engaging the groove to firmly secure the hub to the barrel. The plug is inserted into the barrel, the end of the plug interlocking with the shaft of the terminal assembly rotor to effectuate switching of contacts. To bias the plug, a spring mount which mounts a coil spring is interposed between the plug and the shaft of the rotor for the terminal assembly, one end of the spring engaging a catch on the hub to urge the rotation of the plug and shaft.

6 Claims, 14 Drawing Figures

FIG. 1
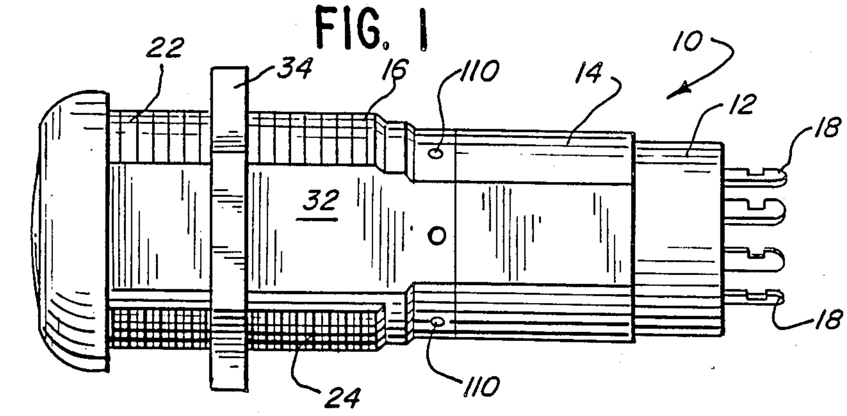
FIG. 2A
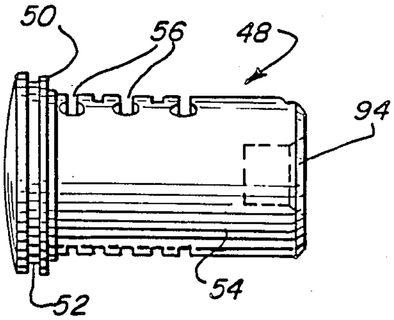
FIG. 2B
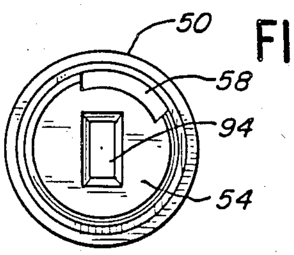
FIG. 3C
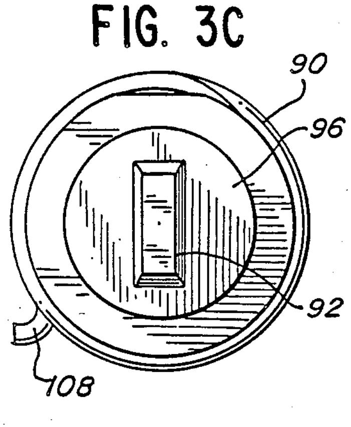
FIG. 3A
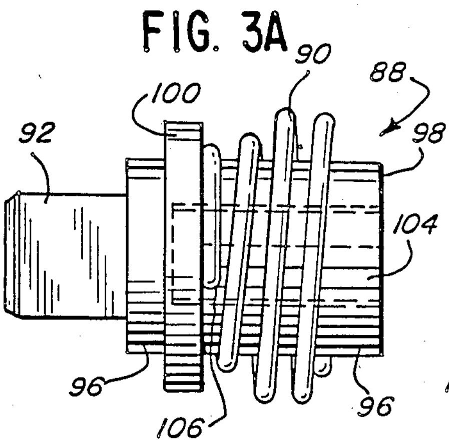
FIG. 3B
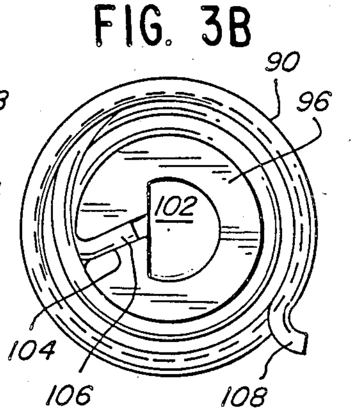
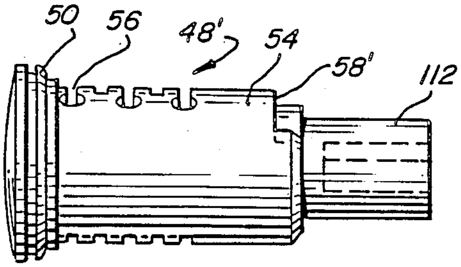
FIG. 4A
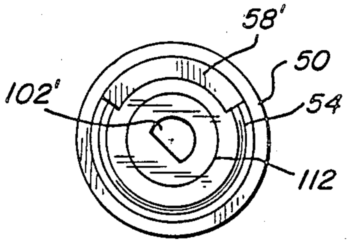
FIG. 4B FIG. 6
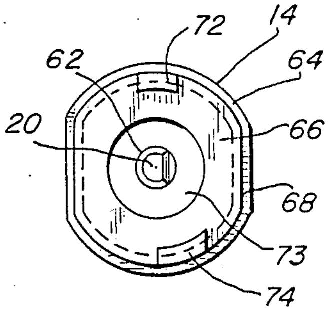
FIG. 5
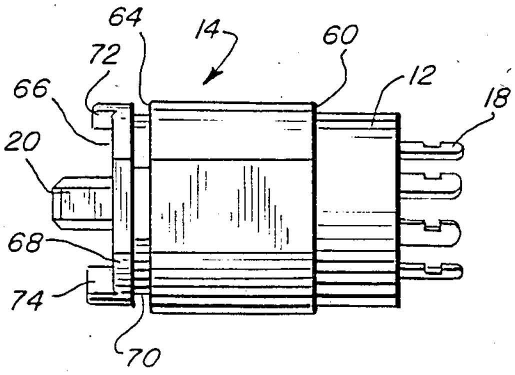
FIG. 8
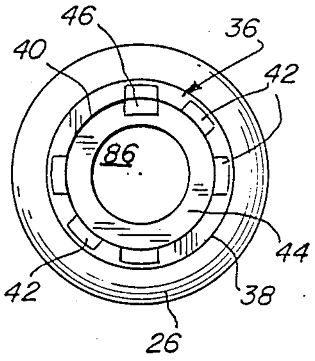
FIG. 7
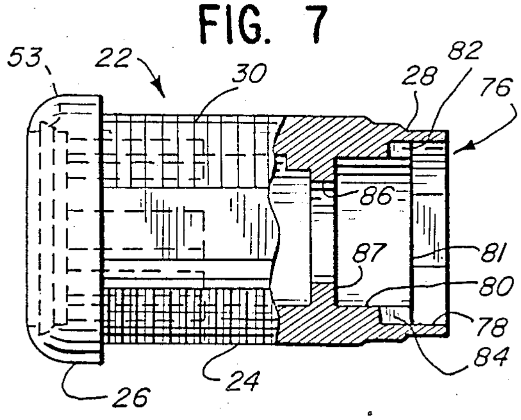
FIG. 9
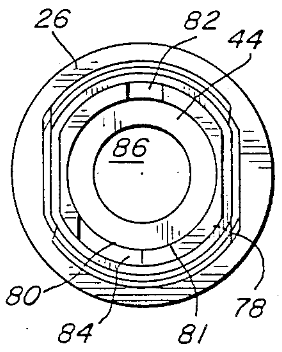
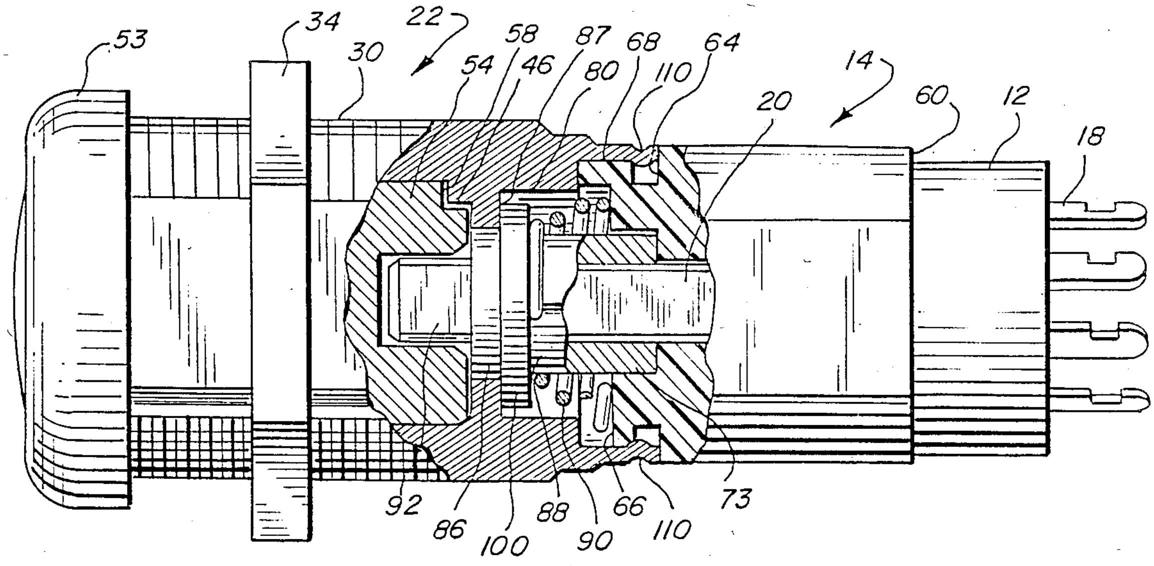
FIG. 10

METHOD FOR ASSEMBLY OF ANTI-STATIC SWITCH LOCK

This is a division of application Ser. No. 411,259, filed Aug. 25, 1982, now U.S. Pat. No. 4,427,852 issued Jan. 24, 1984.

BACKGROUND OF THE INVENTION

1. Field of the Invention

This invention relates to key operated switches and more particularly to anti-static switch locks and methods for assembly thereof.

2. Description of the Prior Art

Anti-static switch locks occurring in the prior art are exemplified by U.S. Pat. No. 4,009,357 issued to Naylor, Feb. 22, 1975. Locks of this type are comprised of a metallic barrel which houses a rotatable, key operated plug. Affixed to the end of the plug is a shaft which, in turn, has on its end a rotor. The rotor, housed within a terminal assembly, connects the various terminals of a terminal assembly upon rotation of the plug. Holding the terminal assembly to the barrel is a non-conductive adapter having a pair of legs to engage and hold the adaptor to the barrel. A similar pair of legs engage and hold the terminal assembly to the adaptor.

The switch locks of the aforementioned type are subject to the problem of disengagement of the adapter from the barrel resulting in disassembly of the lock. Furthermore, these switch locks do not have a means whereby the plug and rotor may be biased toward a specific position.

An improvement over switch locks exemplified by U.S. Pat. No. 4,009,357 is found in U.S. Pat. No. 4,405,843. This switch lock includes a means for preventing disengagement of the hub legs from the barrel and also a means for biasing the plug and rotor in a desired manner.

The improved switch lock mentioned above is relatively costly to construct due to the structure necessary to accomplish the prevention of disassembly and the biasing of the plug and rotor. Furthermore, this type of switch lock may permit a degree of play between the hub and barrel as assembled which, if severe enough, could prevent the plug from rotating the rotor sufficiently enough to permit proper switching to take place within the terminal assembly.

It is therefore the object of the present invention to overcome one or more of the problems noted in prior art anti-static switch locks.

SUMMARY OF THE INVENTION

Accordingly, an anti-static switch lock and method of assembly thereof are set forth wherein disassembly of the switch lock is prevented without requiring costly manufacture of the components and wherein the improper or insufficient rotation of biased switch locks heretofore encountered is prevented.

Toward this end, an anti-static switch lock and method of assembly are provided wherein a terminal assembly having the desired configuration of rotor and contacts is secured to one end of a hub. The other end of the hub has an inboard lipped boss protruding axially therefrom with a radial groove circumscribed thereon.

Providing the switching and locking of the switch lock, is a keylock assembly which includes a barrel and a key operated, rotatable plug. One end of the barrel has a chamber to receive the lipped boss of the hub.

To assemble the switch lock the hub, having the terminal assembly attached to one end, is positioned such that the lip and groove are disposed within the chamber of the barrel. Thereafter a number of indentations or stakes are formed in the barrel, the indentations or stakes engaging the groove of the lip to firmly secure the hub to the barrel. Finally the plug is inserted into and received within the barrel, the end of the plug opposite its keyway, interlocking with the shaft of the terminal assembly rotor which passes axially through the hub for operation of the rotor to effectuate switching of contacts.

Should biasing of the rotor and plug toward a certain position be desired, a spring mount which mounts a coil spring is interposed between the plug and the shaft of the rotor for the terminal assembly. During assembly of the switch lock one end of the spring engages a catch on the hub and becomes securely seated in a notch in the barrel. The spring and spring mount are housed within a bore which permits the expansion and contraction of the spring as the plug is rotated. Accordingly, the spring which normally urges the plug and interconnected rotor shaft to a desired position is free to expand or contract without encountering surrounding structure and possibly binding further rotation or preventing proper spring return of the plug.

Accordingly, one object of the present invention is to set forth a method for assembling a switch lock to prevent subsequent disassembly thereof without requiring specialized structure to be manufactured to tolerance on the plug and barrel.

It is a further object of the present invention to set forth a switch lock which, when biasing of the plug and rotor shaft to a certain position is desired, the biasing spring is kept in such a fashion that binding of the plug rotation is prevented assuring free rotation and automatic return of the plug upon release due to the urging of the spring.

Further objects and advantages will become apparent from the study of the specification, claims and attached drawings.

BRIEF DESCRIPTION OF THE DRAWINGS

FIG. 1 is a side view of an embodiment of the switch lock, as assembled, of the present invention;

FIG. 2A is a side view of a plug (shown without tumblers) adapted for use with the switch lock of the present invention;

FIG. 2B is an end view of the plug shown from the right side of FIG. 2A;

FIG. 3A is an enlarged side view of the spring mount adapted to be coupled with the plug illustrated in FIGS. 2A and 2B when biasing of the switch lock is desired;

FIG. 3B is an end view of the right side of the spring mount illustrated in FIG. 3A;

FIG. 3C is an end view of the left side of the spring mount illustrated in FIG. 3A;

FIG. 4A is a side view of a plug shown without tumblers for clarity for use in the anti-static switch lock when biasing of the rotation of the switch lock is not desired;

FIG. 4B is an end view of the right side of the plug as illustrated in FIG. 4A;

FIG. 5 is an side elevation view of the assembled hub and terminal assembly for the anti-static switch lock;

FIG. 6 is an end view of the hub as seen from the left in FIG. 5;

FIG. 7 is a side view of the barrel of the keylock assembly for the anti-static switch lock with portions thereof removed for clarity;

FIG. 8 is an end view of the barrel as viewed from the left of FIG. 7;

FIG. 9 is an end view of the barrel for the anti-static switch lock as viewed from the right of FIG. 7; and FIG. 10 is an enlarged view of the assembled switch lock similar to that of FIG. 1 with portions thereof removed to illustrate the assembly of the components.

DESCRIPTION

Turning to the drawings, FIG. 1 illustrates the anti-static switch lock 10 of the present invention in its assembled form. The switch lock 10 includes a terminal assembly 12 mounted to a hub 14, the hub 14 in turn being secured to a keylock assembly 16. In that the terminal assembly 12 is conventional and does not form part of the invention as described herein, only those parts and functions necessary for an understanding of the present invention will be set forth. Furthermore, when the term "insulated" is used, it is to be understood that what is meant is electrically non-conductive.

The terminal assembly 12 as shown in FIGS. 1 and 5 has an outer insulated casing which mounts a plurality of terminals 18 and which houses a rotor (not shown). By turning an insulated, semicircular shaft 20, connected to the rotor, effectuates the electrical connection between the various terminals 18. The terminals 18 are connected to the electrical circuit for which the protection offered by the switch lock 10 is required. It should be noted that various terminal assemblies 12 can be substituted for the four terminal assembly shown in the drawings depending upon the switching requirements between the terminals. Therefore, whenever the terminal assembly is referred to, it is to be understood that the description is not to be limited to only the four-terminal terminal assembly 12 illustrated.

To rotate the shaft 20 of the terminal assembly 12, the keylock assembly 16 is used. The keylock assembly 16 includes a barrel 22, an embodiment of which is shown in FIGS. 7–9. The barrel 22 consists of a body 24 having at one end an escutcheon 26 and at the other end a barrel end 28. As illustrated in FIG. 7, the body 24 is cylindrical, having outer threads 30 interrupted by opposing flats 32 which, in cooperation with a nut 34, serve to mount the switch lock 10 to a panel board.

Extending into the body 24 from the end having the escutcheon 26 is a plug receptacle 36. As shown in FIGS. 7, 8 and 10, the plug receptacle 36 consists of a plug locking bore 38, and a tumbler bore 40 having disposed thereabout a number of tumbler stops 42. The tumbler bore 40 has a terminus at an end wall 44 disposed near the barrel end 28. A plug stop 46 extends from the end wall 44 along the side of the tumbler bore 40 and toward the escutcheon 26 for purposes which will hereinafter become evident.

When the switch lock 10 has spring return a plug 48 of the type shown in FIGS. 2A and 2B is rotatably received into and locked within the tumbler bore 40 of the barrel 22. The plug 48 has at one end a cylindrical head 50 having a circumferential locking groove 52 which, in cooperation with a similar ring groove 53 disposed about the locking bore 38 of the barrel 22, receives a locking ring (not shown) to secure the rotatable plug 48 within the plug receptacle 36. Extending coaxially from the head 50 is a cylindrical plug body 54 having a number of tumbler ways 56 to receive a like number of tumblers (not shown) which retract into and extend from the plug body 54. In a conventional fashion, a keyway (not shown) extends axially from the head 50 into the plug body 54 to, upon insertion of a suitable key, retract the spring loaded tumblers into the plug body 54 and permit rotation of the plug 48 within the plug receptacle 36. As set forth below, rotation of the plug 48 rotates the shaft 20 of the terminal assembly 12 to electrically interconnect or disconnect the various terminals 18. Upon removal of the key the tumblers extend from the plug body 54 to engage the tumbler stops 42 and thereby prevent rotation of the plug 48 within the plug receptacle 36. It is to be understood at this point that while the plug receptacle 36 illustrated in FIGS. 7 and 8 has six tumbler stops 42, that the anti-static switch lock of the present invention comprehends the use of different barrels for the keylock assembly having a differing number or different arrangement of tumbler stops 42.

To limit the rotation of the plug 48 within the plug receptacle 36, the plug 48 has at its end opposing the head 50 a semicircular stop segment 58 which cooperates with the plug stop 46 to restrict the rotation of the plug 48 within a plug receptacle 36.

Turning now to FIGS. 5, 6 and 10, the insulated hub 14 for attaching the desired terminal assembly to the keylock assembly 16 is shown in detail. The hub 14 has a first end 60 adapted to attach the terminal assembly 12 thereto. For example, the first end 60 may have a cylindrical, lipped boss (not shown) which is snappingly received into a cooperating recess (not shown) in the terminal assembly 12 for connection therebetween. Sonic welding of the connection may subsequently be used to assure the permanent attachment of the terminal assembly 12 to the hub 14.

To provide a means for connecting the hub 14, and thereby the terminal assembly 12 to the keylock assembly 16, the hub 14 has a second end 64 with a cylindrical boss 66 extending coaxially therefrom, the boss 66 having a radially outwardly extending lip 68 spaced from the second end 64. The lip 68, in cooperation with the second end 64, forms a circumferential staking groove 70. As seen in FIGS. 5 and 6, boss 66 and lip 68 are spaced inboard of the outer surface of the hub 14 and, with the outer surface of the hub 14, have opposing flats similar to those on the barrel 22 to permit insertion of the switch lock 10 through the panel board and to mate with the barrel end 28 as subsequently described. Extending axially from the lip 68 away from the second end 64, is an aligning tab 72 to align the interconnection between the hub 14 and keylock assembly 16 and an offset spring catch 74. A cylindrical pocket 73, of a diameter smaller than the boss 66, is located axially into the boss 66 for purposes which will hereinafter become evident.

To pass the shaft 20 of the terminal assembly 12 through the hub 14 for rotation by the plug 48, the hub 14 has an axial shaft bore 62 extending therethrough. When the terminal assembly 12 is aligned and snapped to the hub first end 60, the shaft 20 passes through the shaft bore 62 to emerge from the boss 66 at the second end 64 of the hub 14 as illustrated in FIG. 5.

To receive and mount the hub 14, the barrel end 28 of the keylock assembly 16, as shown in FIGS. 7, 9 and 10, has a mounting chamber 76 composed of an outer lip receptacle 78 and an inner, lesser diameter, cylindrical spring housing 80. Viewing FIG. 9, it is seen that the lip receptacle 78 is generally cylindrical having opposed flat, parallel walls aligned with the barrel flats 32 to mate with and closely receive the boss 66 and its lip 68 having the mating flats described above. It is to be noted that the wall of the metallic barrel end 28 surrounding the lip receptacle 78 is thin relative to the remaining structure of the barrel 22 to permit the attachment of the hub 14 to the keylock assembly 16 in the manner described below. It is further to be noted that a shoulder 81 forms the transition between the lip receptacle 78 and the lesser diameter spring housing 80. A notch 82 extends inward from the lip receptacle 78 into the shoulder 81 to closely receive the tab 72 of the hub 14 and align the connection between the hub 14 and keylock assembly 16. Opposite the notch 82, the shoulder 81 has a semicircular slot 84 to receive the catch 74 of the hub 14 in a manner described in detail below. An axial passageway 86 extends through the endwall 44 between the plug receptacle 36 and the chamber 76.

As stated above, the plug 48 illustrated in FIGS. 2A and 2B is to be employed when biasing of the plug 48 and thereby the shaft 20 and rotor of the terminal assembly 12, is desired. To interconnect the plug 48 and the shaft 20 and to provide for the aforesaid biasing, the anti-static switch lock 10 includes a spring mount 88 to mount and secure one end of a coil spring 90 as illustrated in FIGS. 3A-3C. The spring mount 88 is generally cylindrical, having a rectangular tongue 92 extending axially from one end, the tongue 92 being adapted for reception into a rectangular opening 94 extending axially into the end of the plug 48 opposite the head 50 as best shown in FIGS. 2A and 2B. Adjacent to the tongue 92 is the cylindrical body portion 96 having at its end opposing the tongue 92 a flat face 98. The body portion 96 of the spring mount 88 is dimensioned to be closely received into the passageway 86 in the end wall 44 to maintain the alignment of the plug 48, spring mount 88 and shaft 20 which contributes to the non-binding rotation and return of the rotating elements of the switch lock 10. A cylindrical collar 100 disposed around the body portion 96 in the vicinity of the tongue 92 engages the end wall 44 about the passageway 86 to properly locate the spring mount during the assembly of the switch lock 10. Extending axially inward from the face 98 of the spring mount 88 is a semicylindrical shaft bore 102 adapted to closely receive the shaft 20 of the terminal assembly 12. As best shown in FIG. 3B, a slit 104 extends angularly from the shaft bore 102 along the length of the body portion 96 to have a terminus adjacent to the collar 100. The slit 104 receives one end 106 of the coil spring 90 to mount the spring about the body portion 96. The other end 108 of the spring 90 is turned outward for purposes which will hereinafter become evident.

With the above description of an embodiment of the anti-static switch lock 10 set forth above, the method for assembly of the switch lock 10 can be set forth. Subsequent to the attachment of the terminal assembly 12 to the first end 60 of the hub 14, resulting in the assembly as illustrated in FIG. 5, the spring mount 88 with surrounding spring 90 is placed over the shaft 20 of the terminal assembly 12, the shaft 20 being received into the shaft bore 102 of the spring mount 88. In this position the other end 108 of the spring 90 lies contiguous to the catch 74 and the body portion 96 is seated within the pocket 73 of boss 66. Thereafter, the tab 72 is aligned with the notch 82 of the chamber 76 in the barrel 22 and the boss 66 and lip 68 are inserted into the chamber 76 and more particularly the lip receptacle 78. As shown in FIG. 10, the second end 64 abuts the barrel end 28 and the lip 68 bears against the shoulder 81. It is to be noted that the other end 108 of the spring 90 is trapped within the slot 84 between the wall of the slot and the catch 74. Furthermore, the body portion 96 is received into the passageway 86 and the collar 100 is disposed to reside against the shoulder 87 formed between the spring housing 80 and the passageway 86.

Accordingly, viewing FIG. 10, it is seen that the spring mount 88 is axially aligned within the barrel 22 and rotatably maintained in alignment by the reception of the body portion into the passageway 86 and the pocket 73 of the hub 14. The collar 100 and pocket 73 cooperate to prevent axial displacement of the spring mount 88 within the barrel chamber 76. Furthermore, it is seen that the spring 90 is kept between the collar 100 and the boss 66 inward of the wall of the spring housing 80. Due to the aforementioned alignment of the spring mount 88 against both radial and axial displacement and the retention of the spring 90 within the spring housing 80, the binding of rotation or spring return of the components caused by misalignment or by the spring engaging its surrounding heretofore experienced in prior art switch locks is prevented.

As seen in the drawings, the insertion of the boss 66 and lip 68 into the chamber 76 results in the staking groove 70 being located within the lip receptacle 78. In this position the hub 14 and keylock assembly 16 are disposed for connection.

To secure the hub 14 to the keylock assembly 16 a number of indentions or stakes 110 are formed by a punch or other suitable tool in the wall 85 inward from the outer surface of the barrel end 28 into the staking groove 70. These stakes 110 secure the hub 14 to the keylock assembly 16 in such a manner that disassembly is prevented and without requiring elaborate manufacturing of interlocking structure as heretofore required in prior art switch locks. It is to be noted that while the drawings depict the formation of the stakes 110 as indentions, that other forms of stakes such as pins, rivets or the like could also be employed. However, for simplicity of assembly, the indentions are preferred.

To complete the structure of the switch lock 10, the plug 48 is inserted into the plug receptacle 36 such that the tongue 92 of the spring mount 88 is received into the opening 94. However, due to the orientation of the plug stop 46 and the stop segment 58, the plug 48 must be partially rotated before complete insertion into the plug receptacle 36. Thereafter, the plug 48 is locked within the plug receptacle 36 by the locking ring.

To operate the switch lock 10 to effect the electrical connection between the terminals 18, the appropriate key is inserted into the plug 48 thereby retracting the tumblers from the tumbler stops 42, freeing the plug 48 for rotation within the barrel 22. The plug 48 is rotated against the bias exerted by the spring 90 in turn rotating the spring mount 88, shaft 20 and rotor within the terminal assembly 12 making or breaking contact between the terminals 18. It is to be noted that the components may be arranged such that the plug 48 is not rotated against the spring bias but rather is urged by the spring 90 upon insertion of the key to the desired position limited by the plug stop 46 and stop segment 58. To withdraw the key either the plug 48 is returned to its original position or tumbler ways must be located so as to receive the tumblers when the key is withdrawn at a different plug position.

The switch lock 10 may be modified, as described below, when biasing of the rotation of the lock is not desired. Like reference numerals refer to like parts while those components which are modified will carry a prime (′).

When a switch lock 10 is not required to have a biased or spring return of the rotatable components as set forth above, the plug 48, spring mount 88 and spring 90 described above may be replaced by a plug 48′ as shown in FIGS. 4A and 4B. The plug 48′ has a head 50 adapted to receive a locking ring to secure the plug 48′ in the barrel 22 and a plug body 54 with tumbler ways 56. The end of the plug body 54 has a stop segment 58′ to limit the rotation of the plug 48′ within the plug receptacle 36. Again, depending upon the number and location of the tumbler stops, the semicircular stop segment 58′ may differ from that shown in the drawings.

To interconnect the plug 48′ with the shaft 20 of the terminal assembly 12, the plug 48′ has a cylindrical extension 112 extending axially therefrom, the extension being of a diameter to pass through the passageway 86 in the end wall 44 and a length to, when assembled in the switch lock 10, enter the pocket 73 of the hub 14. A shaft bore 102′ extends axially inward from the end of the extension 112 and is adapted to closely receive the shaft 20 of the terminal assembly 12.

To assemble this alternate embodiment of the switch lock 10, the terminal assembly 12 and hub 14 are interconnected in a manner described above. Thereafter, also in the manner described above, the boss 66 and lip 68 of the hub 14 are inserted into the chamber 76 thereby positioning the staking groove 70 within the lip receptacle 78. The same indentions or stakes 110 are formed about the periphery of the hub mount 28 to secure the hub 14 to the keylock assembly 16. Thereafter the plug 48′ is inserted into the plug receptacle 36, with the shaft 20 being received into the shaft bore 102′ and the extension 112 passing through the passageway 86 and into the hub pocket 73. The plug 48′ is locked within the plug receptacle 36 with a locking ring thereby completing the assembly of the switch lock 10. As above, the passageway 86 and pocket 73 cooperate to maintain the axial and radial alignment of the rotating components assuring their free rotation.

Thus, more specifically, as seen in FIG. 10 of the drawing, the invention comprehends an improved method for assembling a switch lock 10 of the type having a terminal assembly 12 attached to one end of a hub 14. A lock assembly 16 is provided including a key-operated plug 48 rotatable to operate the terminal assembly for switching and a barrel 22 to receive the plug. The barrel includes an end 28 adapted to receive a portion of the end of the hub. The structure is assembled by inserting the end portion of the hub into the barrel end to a limit defined by abutment of a radial stop surface 64 on the hub, with a distal end of the barrel end and abutment of a distal end 72 of the hub with a radial stop surface 87 on the barrel end. The barrel end is staked directly to the hub portion to interconnect the hub and barrel. For this purpose, the hub end defines a radially opening recess 70 intermediate the hub end stop surface 64 and the hub end distal end 72. The barrel end is staked by radially inwardly deforming the barrel end into the recess, as seen in FIG. 10, at a location spaced from the barrel end distal end abutting the surface 64 to cause the deformed portion of the barrel end distal end to bear against the hub end at the edge of the recess most remote from the hub end stop surface 64. The barrel end distal end surface abutting the hub end stop surface 64 remains substantially undeformed, as seen in FIG. 10. To complete the assembly, the key-operated plug 48 is positioned in the barrel, which has been thusly interconnected with the hub for operation of the terminal assembly.

While we have shown and described certain embodiments of the present invention, it is to be understood that it is capable of various modifications without departing from the spirit and scope of the invention described herein, shown in the drawings and as set forth in the claims.

We claim:

1. A method for assembling a switch lock of the type having a terminal assembly attached to one end of a hub, a lock assembly including a key-operated plug rotatable to operate the terminal assembly for switching and a barrel to receive the plug, said barrel having an end adapted to receive a portion of the other end of said hub, said method comprising:

inserting said portion of the other end of the hub into the barrel end to a limit defined by abutment of a radial stop surface on the hub with a distal end of said barrel end and abutment of a distal end of the hub portion with a radial stop surface on the barrel end;

staking said barrel end directly to said hub portion to interconnect said hub and barrel, said hub end defining a radially opening recess intermediate said hub end stop surface and hub end distal end, said step of staking comprising radially inwardly deforming said barrel end into said recess at a location spaced from said barrel end distal end to cause the deformed portion of the barrel end distal end to bear against the hub end at the edge of the recess most remote from said hub end stop surface and with the barrel end distal end abutting said hub end stop surface remaining substantially undeformed; and positioning said key-operated plug in said barrel interconnected with the hub for operation of said terminal assembly.

2. The method of claim 1 wherein said staking includes deforming said barrel end to engage and secure said hub portion.

3. The method of claim 2 wherein said deforming includes depressing said barrel end radially inwardly to engage said hub portion to interlock said hub and said barrel.

4. The method of claim 3 wherein said depressing includes forming at least one radially inwardly directed dimple-like indentation.

5. The method of claim 1 wherein six equally spaced, dimple-like projections are punched radially inwardly to engage and secure to said barrel end with said hub portion in said staking step.

6. The method of claim 1 wherein said staking step includes stamping at least one dimple-like projection in said barrel end inward into said recess.

* * * * *